US009198067B2

(12) United States Patent
Choi et al.

(10) Patent No.: US 9,198,067 B2
(45) Date of Patent: Nov. 24, 2015

(54) METHOD AND SYSTEM FOR DETECTING COVERAGE HOLE IN WIRELESS NETWORK

(71) Applicant: Korea Advanced Institute of Science and Technology, Daejeon (KR)

(72) Inventors: Jun Kyun Choi, Daejeon (KR); Seung Hyun Jeon, Daejeon (KR); Man Sun Park, Daejeon (KR); Jun San Kim, Dajeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/465,654

(22) Filed: Aug. 21, 2014

(65) Prior Publication Data

US 2015/0215798 A1   Jul. 30, 2015

(30) Foreign Application Priority Data

Jan. 29, 2014   (KR) .......................... 10-2014-0011436

(51) Int. Cl.
*H04W 24/00*   (2009.01)
*H04W 24/08*   (2009.01)

(52) U.S. Cl.
CPC .................................. *H04W 24/08* (2013.01)

(58) Field of Classification Search
CPC ...................................................... H04W 24/08
See application file for complete search history.

(56) References Cited

U.S. PATENT DOCUMENTS

| | | | |
|---|---|---|---|
| 2006/0075131 A1* | 4/2006 | Douglas et al. | 709/230 |
| 2006/0128371 A1* | 6/2006 | Dillon et al. | 455/423 |
| 2009/0257373 A1* | 10/2009 | Bejerano | 370/328 |
| 2013/0070615 A1* | 3/2013 | Lennartson et al. | 370/242 |
| 2013/0215734 A1* | 8/2013 | Asghar et al. | 370/216 |
| 2014/0199983 A1* | 7/2014 | Bergstrom et al. | 455/418 |
| 2014/0220970 A1* | 8/2014 | Yang et al. | 455/434 |
| 2014/0321416 A1* | 10/2014 | Pragada et al. | 370/329 |

* cited by examiner

*Primary Examiner* — Erin File

(74) *Attorney, Agent, or Firm* — Marshall, Gerstein & Borun LLP

(57) ABSTRACT

A method and system for detecting a coverage hole in a wireless network are disclosed. As a method for detecting a coverage hole realized by a computer, provided herein is a method for detecting a coverage hole comprising a step of obtaining multiple coordinates estimated from position information and signal status of an access point (AP), the AP being accessible by a subscriber user equipment, and a step of detecting a coverage hole of the subscriber user equipment by using the multiple position coordinates.

4 Claims, 4 Drawing Sheets

METHOD AND SYSTEM FOR DETECTING COVERAGE HOLE IN WIRELESS NETWORK

This application claims the benefit of the Korean Patent Application No. 10-2014-0011436, filed on Jan. 29, 2014, which is hereby incorporated by reference as if fully set forth herein.

BACKGROUND OF THE INVENTION

1. Field of the Invention

The exemplary embodiments of the present invention relate to a method and system for detecting a coverage hole of a subscriber in a wireless cellular network.

2. Discussion of the Related Art

Generally, a position based service using a global position system (GPS) signal provides a service wanted by a user by measuring an accurate position within a region where a GPS signal is being received.

Such GPS system was first developed by the United States Department of Defense in the early 1970's and began its full-scale operation in the mid 1990's. The GPS system refers to a most ideal navigation system that can be used throughout the entire global region regardless of time and climate (or weather conditions). Although the GPS system was first developed for military purposes, due to its economic efficiency and usefulness, the GPS system has rapidly extended its field of usage for civilian usage, and the GPS system is currently known as the most generally used navigation system.

For example, diverse types of transportation vehicles, such as ships, airplanes, automobiles, and so on, are equipped with a GPS measurement device in order to verify the current position and travel speed or to decide a travel path. Such GPS location determination device receives radio waves indicating latitude, longitude, altitude, and so on, from 4 or more satellites located within 6 middle earth orbits, thereby being capable of calculating (or computing) the current position of the corresponding transportation vehicle.

However, since such GPS measurement device is capable of performing location measurement only in regions where signals can be received from the satellites, when the vehicle enters an indoor or outdoor coverage hole (or shadow area), such as the inside of a building or a tunnel, where GPS signals cannot be received, it is impossible to perform position search by using the GPS signal.

Therefore, the method of receiving a GPS signal and outputting a current position within an installed electronic map is disadvantageous in that it cannot be used in a coverage hole, where the GPS signal cannot be received.

In order to resolve the above-described problems, a technology for estimating the position (or location) of a subscriber even in a coverage hole, where GPS signals cannot be received, is currently under active research and development.

For example, in the Korean Patent Application No. 10-2011-0005394 (published on Jan. 18, 2001), a geographical information search technology, which can determine current positions by using global coordinates even in coverage holes, by determining a correlation between a Global Coordinate, at which a GPS signal is received, and a Local Coordinate respective to the inside of a building or an outdoor coverage hole, where GPS signals cannot be received, and by converting a local coordinate inside of a building to a global coordinate based upon the determined correlation, is disclosed.

Since the conventional position information detection technology indirectly estimates the position of a subscriber user equipment (UE) by using a triangulation method using GPS information, the information within the coverage hole is unreliable, and, therefore, an additional position detection technology or management server, such as WiFi or GPS, is being required.

SUMMARY OF THE INVENTION

Accordingly, the present invention is directed to a method and system for detecting a coverage hole in a wireless network that substantially obviate one or more problems due to limitations and disadvantages of the related art.

An object of the present invention is to provide a method and system for detecting a coverage hole in a wireless network that can detect a coverage hole of a subscriber by using an access point (AP) that can be accessed by the subscriber and a signal status of the respective AP, instead of using GPS information of the subscriber.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, as a method for detecting a coverage hole realized by a computer, provided herein is a method for detecting a coverage hole comprising a step of obtaining multiple coordinates estimated from position information and signal status of an access point (AP), the AP being accessible by a subscriber user equipment, and a step of detecting a coverage hole of the subscriber user equipment by using the multiple position coordinates.

According to an aspect of the present invention, the step of detecting a coverage hole of the subscriber user equipment may include a step of deciding two longest higher-layer segments among multiple segments each formed between a pair of the multiple position coordinates, and a step of deciding a center point between a center point of a longest segment of the decided two longest higher-layer segments and an intersecting point between the two longest higher-layer segments as a central coordinate of the coverage hole.

According to another aspect of the present invention, the step of detecting a coverage hole of the subscriber user equipment may include a step of deciding two longest higher-layer segments among multiple segments each formed between a pair the multiple position coordinates, a step of deciding an intersecting point between the two segments as a central coordinate of the coverage hole, when both segments have a same length, and a step of deciding a center point between a center point of a longest segment of the decided two longest higher-layer segments and an intersecting point between the two longest higher-layer segments as a central coordinate of the coverage hole, when each of the two segments has a different length.

According to yet another aspect of the present invention, the step of detecting a coverage hole of the subscriber user equipment may further include a step of deciding a distance between a position coordinate located at a furthermost position from the central coordinate of the coverage hole among the multiple position coordinates and the central coordinate of the coverage hole as a radius of the coverage hole.

As a method for detecting a coverage hole realized by a computer, provided herein is a method for detecting a coverage hole including a step of determining the subscriber UE as being located in a coverage hole, when a subscriber user equipment (UE) using a wireless cellular network performs an Access Network Discovery and Selection Function (ANDSF) by using a non $3^{rd}$ Generation Partnership Project (3GPP) network, and a step of accumulating position information received from the subscriber UE through the non 3GPP network and managing the accumulated position information by using a coverage hole map of the subscriber UE.

According to an aspect of the present invention, in the step of determining the subscriber UE as being located in a coverage hole, whether or not the subscriber UE is currently connected to a Home Subscriber Server (HSS) may be verified through the ANDSF, and, when the subscriber UE is currently not connected to the HSS, the subscriber UE may be determined as being located in the coverage hole.

According to another aspect of the present invention, in the step of managing the accumulated position information by using a coverage hole map of the subscriber UE, when the subscriber UE is determined as being located in the coverage hole, identification information related to the subscriber UE may be recorded in a coverage hole management server (CHMS), thereby updating the coverage hole of the subscriber UE.

According to yet another aspect of the present invention, the identification information related to the subscriber UE may include at least one of an international mobile subscriber identity (IMSI), a Cell ID, a tracking area identity (TAI), and a basic service set identifier (BSSI) of a neighboring access point (AP).

According to yet another aspect of the present invention, the CHMS may manage the coverage hole map by hierarchically dividing the coverage hole into a coverage hole for each international mobile subscriber identity (IMSI), a coverage hole for each Cell ID, a coverage hole for each tracking area identity (TAI), and a coverage hole for each beam.

Provided herein is a system for detecting a coverage hole including a memory configured to have at least one program loaded therein, and at least one processor, wherein, based upon a control of the at least one program, the at least one processor may be configured to perform a process of obtaining multiple coordinates estimated from position information and signal status of an access point (AP), the AP being accessible by a subscriber user equipment, and a process of detecting a coverage hole of the subscriber user equipment by using the multiple position coordinates.

Provided herein is a system for detecting a coverage hole including a memory configured to have at least one program loaded therein, and at least one processor, wherein, based upon a control of the at least one program, the at least one processor may be configured to perform a process of determining the subscriber UE as being located in a coverage hole, when a subscriber user equipment (UE) using a wireless cellular network performs an Access Network Discovery and Selection Function (ANDSF) by using a non $3^{rd}$ Generation Partnership Project (3GPP) network, and a process of accumulating position information received from the subscriber UE through the non 3GPP network and managing the accumulated position information by using a coverage hole map of the subscriber UE.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the present invention, a coverage hole of a subscriber may be detected by indirectly performing measurement using an access point (AP) that can be accessed by the subscriber and a signal status of the respective AP, instead of using GPS information of the subscriber, thereby estimating a coverage range (surface area or circle) that is referred to as a coverage hole based upon the accumulated position information.

Under an assumption that coverage holes may vary depending upon movement paths of the subscriber based upon a line of sight (LOS) environment, this exemplary embodiment of the present invention proposes a method of creating a coverage hole map for each subscriber by determining an action performed by a subscriber using a wireless cellular network of searching for an access network discovery and selection function (ANDSF) using another non-3GPP (e.g., WiFi) network as the corresponding subscriber being located in a coverage hole and by accumulating/managing the geographical information transmitted from a subscriber user equipment (UE).

The exemplary embodiments of the present invention may be applied to a communication system, which is configured to detect a coverage hole of a subscriber in a wireless cellular network.

In this specification, a communication system may refer to a communication relay system configured to connect the network and the user equipment, or to a higher layer system configured to control the communication relay system. Herein, the communication system may refer to all types of stations having a coverage cell, such as a base station (BS), a radio access station (RAS), and so on.

Figure 1:
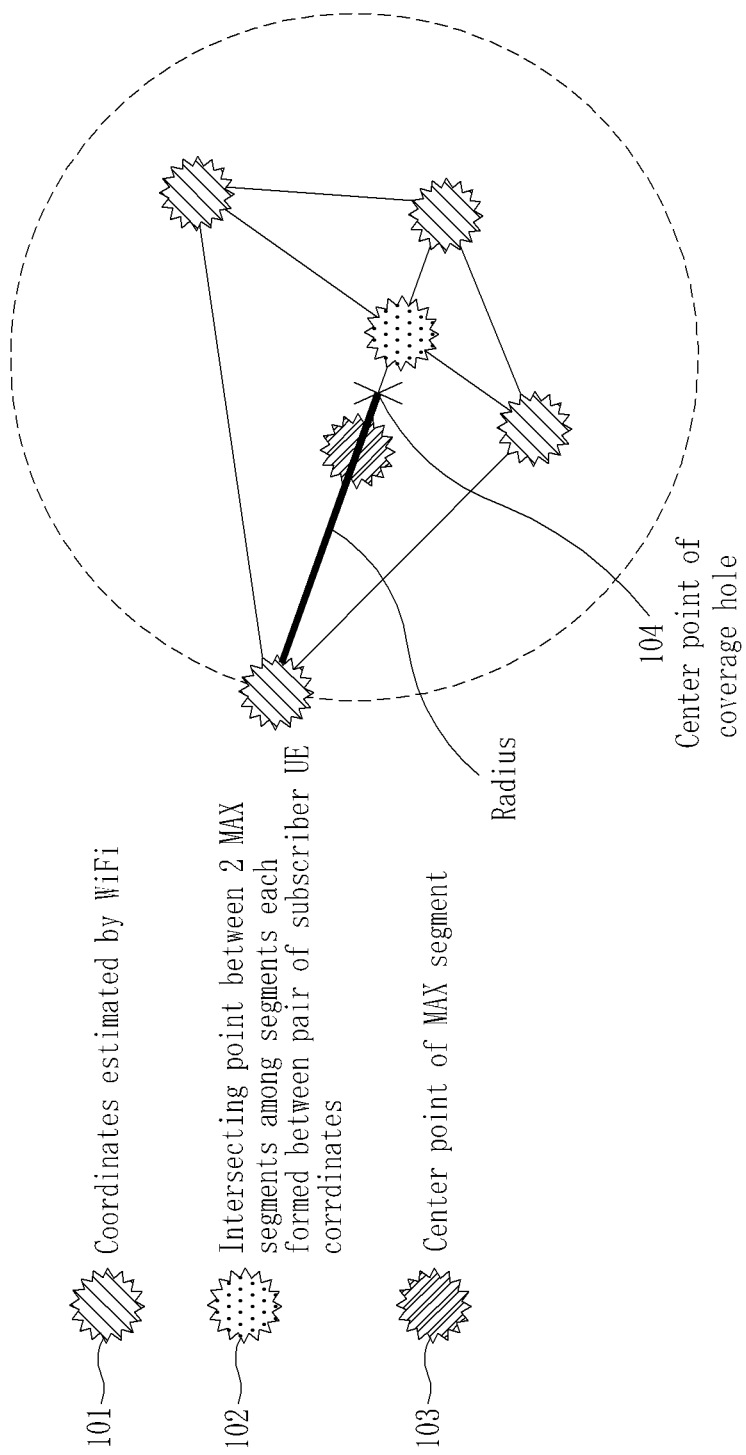
FIG. 1 illustrates a method for estimating a subscriber position in a coverage hole according to an exemplary embodiment of the present invention.

FIG. 1 illustrates a method for estimating a subscriber position in a coverage hole according to an exemplary embodiment of the present invention.

Referring to FIG. 1, a communication system may obtain a position coordinate 101 of an estimated subscriber by using position information and reception sensitivity, and so on, of an accessing AP list, the information being estimated by a subscriber user equipment (UE). And, the communication system may extract all possible segments that can be formed between accumulated subscriber coordinates 101. At this point, the communication system may collect coordinates 101 estimated by WiFi, and, among the estimated coordinates, the communication system may use at least 4 or more coordinates for detecting the coverage hole of the subscriber.

Thereafter, the communication system may decide two longest higher-layer segments (also referred to as MAX segments) having the longest lengths among all segments formed between the coordinates 101 of the subscriber UE, and, then, the communication system may obtain an intersecting point 102 between the two longest segments. Accordingly, the communication system may indirectly estimate the position of the subscriber UE by using GPS information, reception sensitivity, and so on, of WiFi existing near the subscriber UE.

Subsequently, the communication system may obtain a center point 103 of the longest segment (or MAX segment) having the longest length among the segments formed between the coordinates 101 of the subscriber UE, and, then, the communication system estimates a central coordinate between the center point 103 of the longest segment (or MAX segment) and the obtained intersecting point 102 as a central coordinate 104 of the coverage hole. At this point, a distance between the central coordinate 104 and a coordinate located at a furthermost point from the central coordinate 104 among the coordinates estimated by the WiFi becomes the radius of the coverage hole.

With respect to the two longest higher-layer segments having the longest lengths, when the two longest segments have the same length, an intersecting point of the two segments becomes the center point of the coverage hole, and, when the two longest segments have different lengths, a final coordinate corresponding to an average of the central coordinate of the longest segment of the two segments becomes the center point of the coverage hole.

Figure 2:
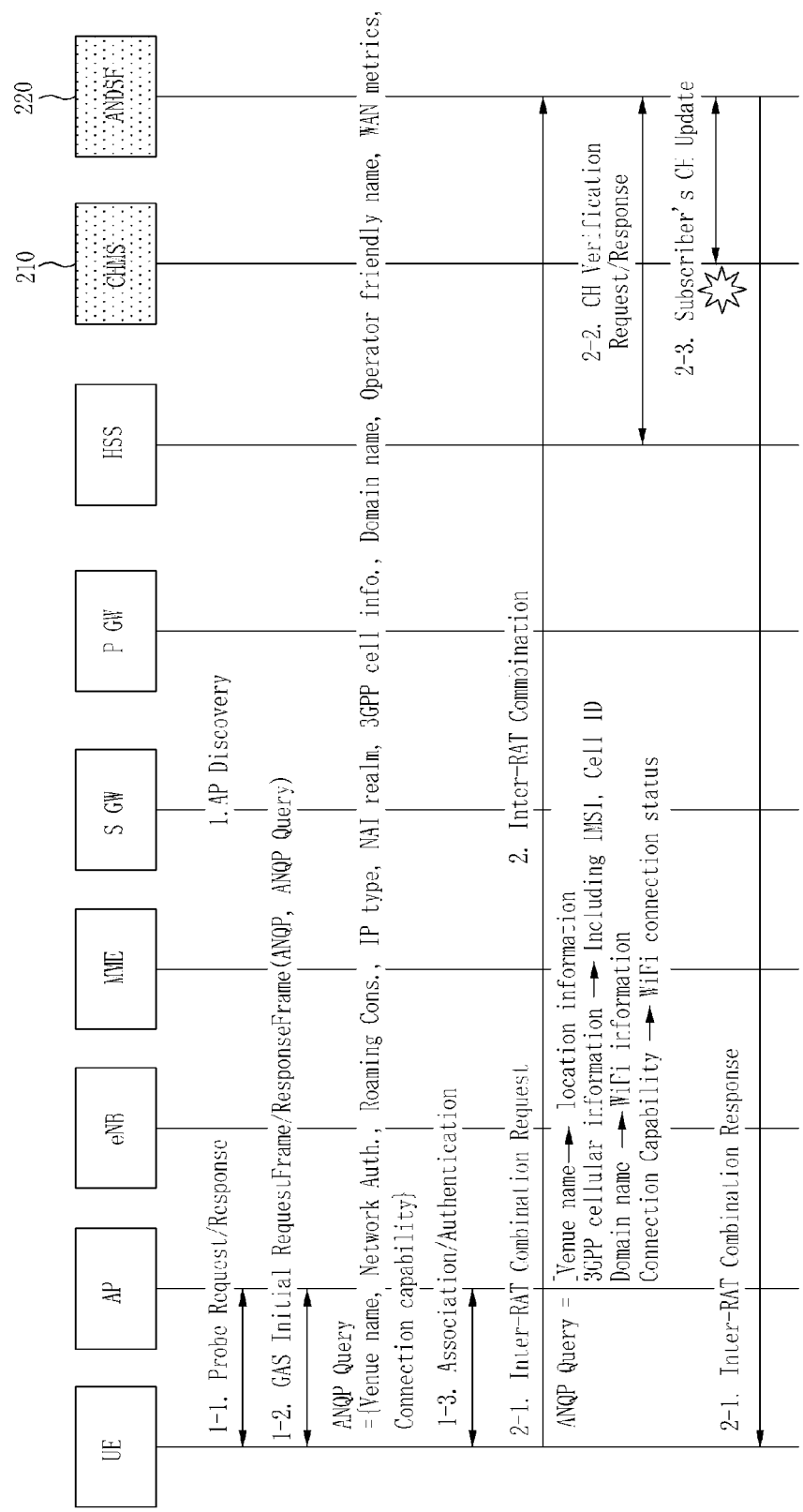
FIG. 2 illustrates a sequence diagram for detecting a coverage hole according to an exemplary embodiment of the present invention.

FIG. 2 illustrates a sequence diagram for detecting a coverage hole according to an exemplary embodiment of the present invention.

In the present invention, a coverage hole management server (CHMS) 210, which is configured to manage a coverage hole map for each subscriber, may be provided. The CHMS 210 may accumulate/manage coordinates of subscriber user equipments (UEs), which are estimated by WiFi, and may then obtain reliable central coordinate and radius of the coverage hole.

The '1. AP Discovery' process of FIG. 2 corresponds to process steps that have already been disclosed in a related standard, and the '2. Inter-RAT Combination' process corresponds to a structure that is proposed in the present invention.

The Access Network Discovery and Selection Function (ANDSF) module 220 requires a control signal structure that can communicate with the CHMS 210. The ANDSF module 220 performs channel verification (CH Verification) on an Inter-RAT combination request of a subscriber user equipment (UE) via communication with a Home Subscriber Server (HSS). Thereafter, based upon the CH Verification result, the ANDSF module 220 may perform a subscriber's channel update (Subscriber's CH Update) of the CHMS 210.

Figure 3:
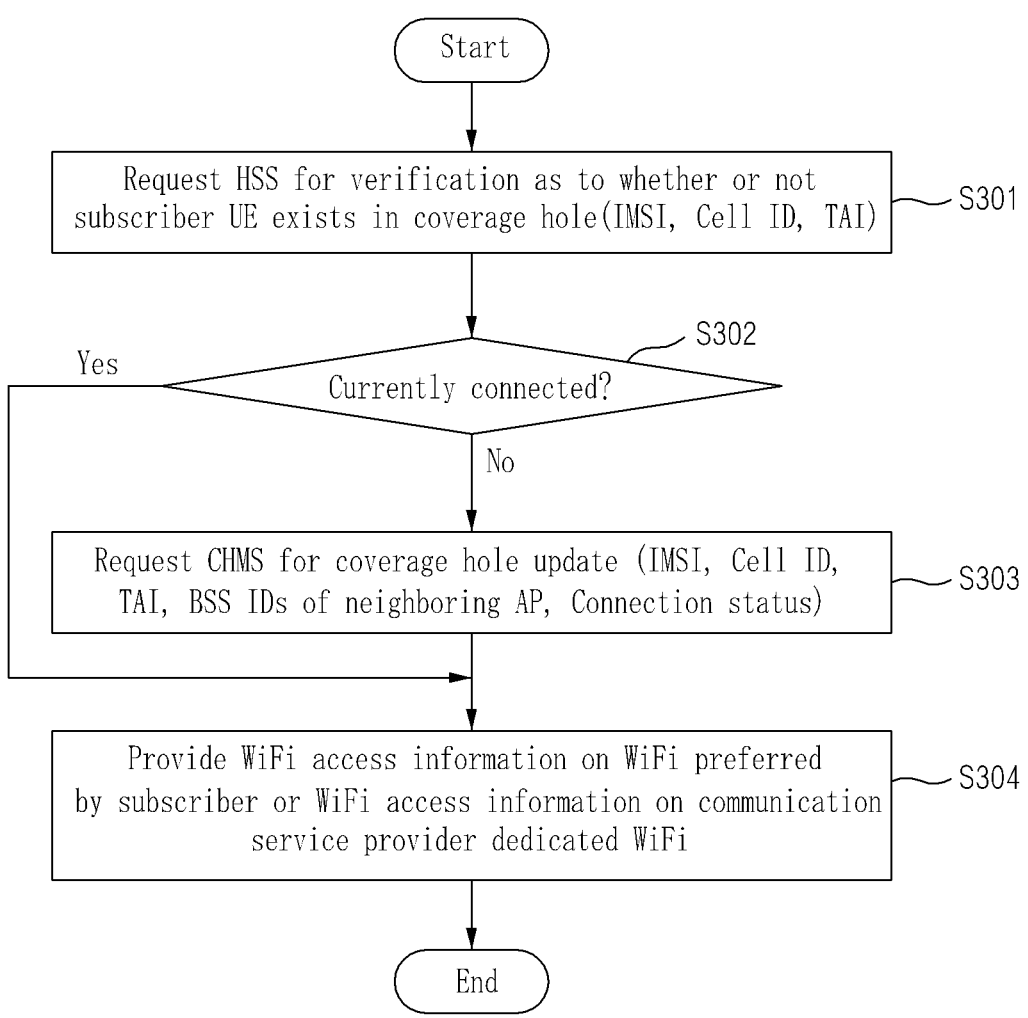
FIG. 3 illustrates a flow chart showing the process steps of a method for verifying a coverage hole in an Access Network Discovery and Selection Function (ANDSF) module according to an exemplary embodiment of the present invention.

FIG. 3 illustrates a flow chart showing the process steps of a method for verifying a coverage hole in an Access Network Discovery and Selection Function (ANDSF) module according to an exemplary embodiment of the present invention.

Even if a currently accessed (or connected) wireless network does not correspond to a coverage hole, since the current access (or connection) may be forcibly changed due to reasons of charging of usage fee, the ANDSF module is required to perform a verification process on the coverage hole.

The ANDSF module may request the Home Subscriber Server (HSS) to perform a verification process as to whether or not the subscriber UE exists in the coverage hole. At this point, the ANDSF module may request for a coverage hole verification by using an international mobile subscriber identity (IMSI), a Cell ID, a tracking area identity (TAI) (S301).

Subsequently, the ANDSF module may verify whether or not the subscriber UE is currently connected to the wireless network through the response received from the HSS (S302). Thereafter, if the subscriber UE is not currently connected to the wireless network, the ANDSF module may determine that the subscriber UE exists in the coverage hole and may then request the CHMS for a coverage hole update with respect to the determined result (S303). At this point, by recording the IMSI, cell ID, TAI, basic service set identifier (BSSI) of a neighboring AP located near the subscriber, the current access (or connection) status, and so on, in the CHMS, the ANDSF module may perform a coverage hole update respective to the subscriber.

Meanwhile, when the subscriber UE is in a state of being currently connected to the wireless network, or after the coverage hole update in completed, the ANDSF module may provide WiFi connection information on a WiFi, which is preferred by the subscriber, or WiFi connection information on a service provider dedicated WiFi, which is installed by a communication service provider, to the subscriber UE (S304).

Figure 4:
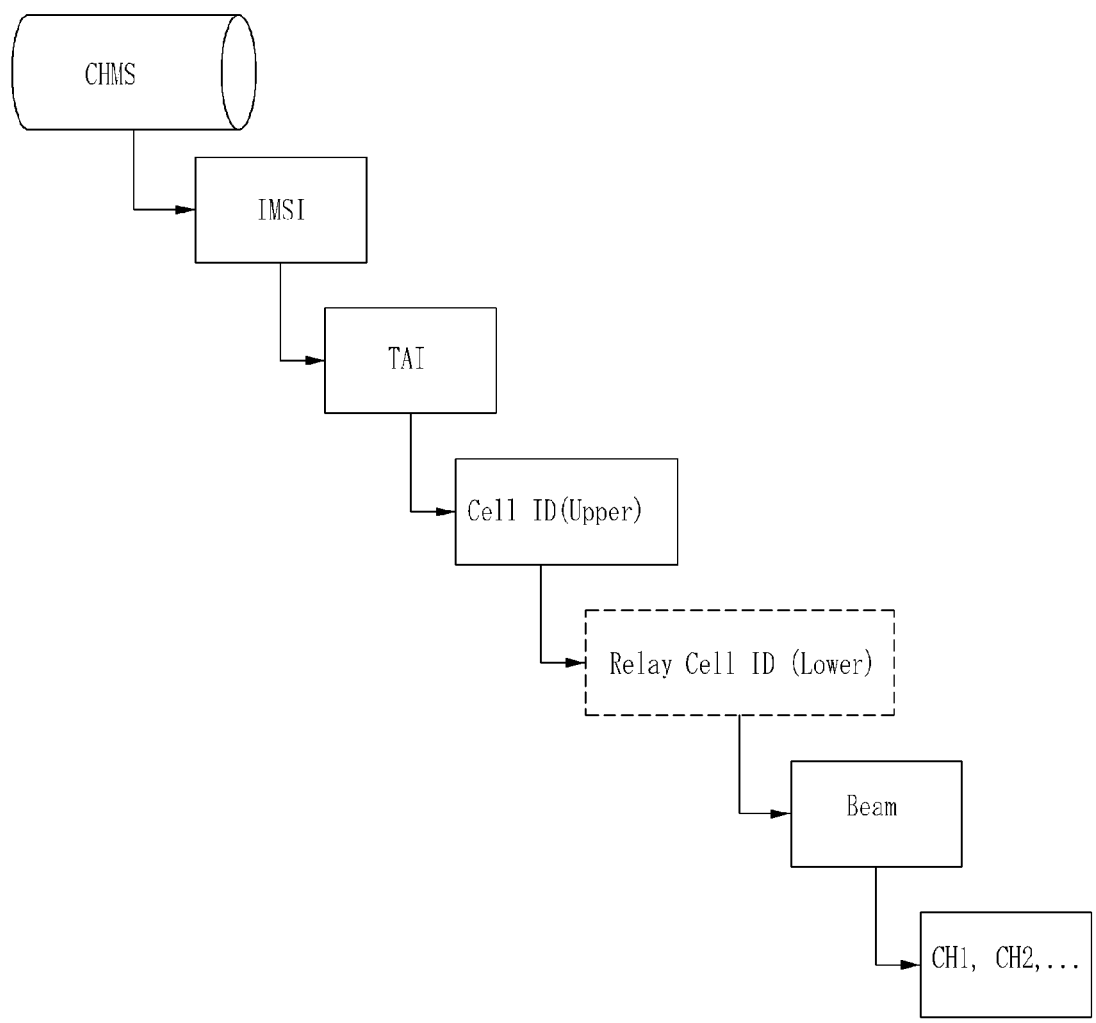
FIG. 4 illustrates a structure of a coverage hole management server according to an exemplary embodiment of the present invention.

FIG. 4 illustrates a structure of a coverage hole management server according to an exemplary embodiment of the present invention.

As a database server that can be interconnected with the HSS by using the IMSI, by accumulating/managing geographical information, which is transmitted from the subscriber UE, the CHMS may perform a role of creating a coverage hole map for each subscriber.

Referring to FIG. 4, by having the ANDSF module record the IMSI, cell ID, TAI, basic service set identifier (BSSI) of the neighboring AP located near the subscriber, and so on, when performing coverage hole update, the CHMS may manage a coverage hole map by hierarchically dividing the coverage hole into a coverage hole for each subscriber (IMSI), a coverage hole for each region (TAI), a coverage hole for each mmWave base station (Cell ID and Relay), and a coverage hole for each beam (e.g., specific building, and so on).

At this point, in order to accommodate a wider range of subscribers, the base station may transmit multiple means. And, accordingly, not a single coverage hole may be generated per beam, or multiple coverage holes may be generated with respect to one beam. Additionally, in order to facilitate the management of the coverage hole for each hierarchical layer, the CHMS may manage a recognizable name along with the respective coverage hole.

The methods according to the exemplary embodiment of the present invention may be realized in the form of a program instruction that can be performed by diverse types of computer systems, so as to be recorded in a computer readable medium.

As described above, the method and system for detecting a coverage hole in a wireless network according to the present invention have the following advantages. In a mm-wave mobile broadband (MMB) system, as a line of sight (LOS) environment, a coverage hole may be easily generated in urban areas. And, in order to resolve such problems, a 4G to 5G level speed may be ensured by using an Inter-RAT relay compact base station/user equipment, which is equipped with a WiFi interface, instead of relaying a mm-wave base station. Additionally, by using a coverage hole for each subscriber of a wireless cellular network, diverse location based applications may be supplied. Moreover, GPS information of the subscriber is not used for performing coverage hole discovery. Furthermore, since an indirect measurement is performed, when the subscriber invokes access information by using the ANDSF, an overhead is not generated in the subscriber signal. And, finally, since a separate server is not configured with respect to the coverage hole for each subscriber, the present invention may also be easily applied to a service, which is used by a communication service provider or application provider using the coverage hole information.

The above-described device according to the exemplary embodiment of the present invention may be realized in the form of a hardware component, a software component, and/or a combination of a hardware component and a software component. For example, the device and corresponding components according to the above-described exemplary embodiments of the present invention may be realized by using at least one or more universal computers or special-purpose computers, such as a processor, a controller, an arithmetic logic unit (ALU), a digital signal processor, a field programmable array (FPA), a programmable logic unit (PLU), a microprocessor, or any type of device that can execute and respond to an instruction (or command). A processing device may execute an operating system (OS) and at least one or more software application, which is executed within the operating system (OS). Additionally, the processing device may respond to the execution of a software application, so as to access, store, manipulate, process, and generate data. In order to facilitate and simplify the understanding of the present invention, the present invention may be described to include only one processing device. However, it will be apparent to anyone skilled in the art that the processing device may include a plurality of processing elements and/or may include multiple types of processing elements. For example, the processing device may include multiple processors, or the processing device may include one processor and one controller. Additionally, other processing configuration, such as a parallel processor, may be configured herein.

The software may include a computer program, a code, an instruction, or a combination of one or more of the above. And, the software may configure a processing device, so that the processing device can be operated as intended, or the software may independently or collectively instruct (or command) the processing device. In order to be interpreted by the processing device, or in order to provide an instruction or data to the processing device, the software and/or data may be permanently or temporarily embodied in any type of machine, a component, a physical equipment (or device), a virtual equipment, a computer storage medium or device, or a transmitted signal wave. Since the software is dispersed (or scattered) within a computer system being connected to a network, the software may be stored or executed by using in a dispersion method. The software and data may be stored in one or more computer-readable recording media.

The method according to the exemplary embodiment of the present invention may be realized in a program command (or instruction) format that may be executed by using diverse computing means, so as to be recorded in a computer-readable medium. Herein, the computer-readable medium may independently include a program command (or instruction), a data file, a data structure, and so on, or may include a combination of the same. The program command being recorded in the medium may correspond to a program command that is specifically designed and configured for the exemplary embodiments of the present invention, or the program command may correspond to a program command that is disclosed and available to anyone skilled in or related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured (or designed) for storing and executing program commands, such as ROMs, RAMs, flash memories, and so on. Examples of a program command may not only include machine language codes, which are created by a compiler, but may also include high-level language codes, which may be executed by a computer by using an interpreter, and so on. The above-mentioned hardware equipment may be configured to be operated as one or more software modules for executing the operations of the exemplary embodiment of the present invention, and vice versa.

It will be apparent to those skilled in the art that various modifications and variations can be made in the present invention without departing from the spirit or scope of the inventions. For example, the above-described techniques may be executed in an order different from that described in the description of the present invention, and/or the components of the above-described system, structure, equipment (or device), circuit, and so on, may be combined in a format different that of the above-described method according to the present invention, and an adequate result may be achieved even if the above-described components of the present invention are replaced by any other component or its equivalent.

Thus, it is intended that the present invention covers other realizations and other embodiments of this invention provided they come within the scope of the appended claims and their equivalents.

What is claimed is:

1. A method for detecting a coverage hole realized by a computer, the method for detecting a coverage hole comprises:
   a step of obtaining multiple coordinates estimated from position information and signal status of an access point (AP), the AP being accessible by a subscriber user equipment; and
   a step of detecting a coverage hole of the subscriber user equipment by using the multiple position coordinates,
   wherein the step of detecting a coverage hole of the subscriber user equipment comprises:
   a step of deciding two longest higher-layer segments among multiple segments each formed between a pair of the multiple position coordinates; and
   a step of deciding a center point between a center point of a longest segment of the decided two longest higher-layer segments and an intersecting point between the two longest higher-layer segments as a central coordinate of the coverage hole.

2. A method for detecting a coverage hole realized by a computer, the method for detecting a coverage hole comprises:
   a step of obtaining multiple coordinates estimated from position information and signal status of an access point (AP), the AP being accessible by a subscriber user equipment; and
   a step of detecting a coverage hole of the subscriber user equipment by using the multiple position coordinates,
   wherein the step of detecting a coverage hole of the subscriber user equipment comprises:
   a step of deciding two longest higher-layer segments among multiple segments each formed between a pair the multiple position coordinates;

when both segments have a same length, a step of deciding an intersecting point between the two segments as a central coordinate of the coverage hole; and when each of the two segments has a different length, a step of deciding a center point between a center point of a longest segment of the decided two longest higher-layer segments and an intersecting point between the two longest higher-layer segments as a central coordinate of the coverage hole.

3. The method of claim 1, wherein the step of detecting a coverage hole of the subscriber user equipment further comprises:

a step of deciding a distance between a position coordinate located at a furthermost position from the central coordinate of the coverage hole among the multiple position coordinates and the central coordinate of the coverage hole as a radius of the coverage hole.

4. The method of claim 2, wherein the step of detecting a coverage hole of the subscriber user equipment further comprises:

a step of deciding a distance between a position coordinate located at a furthermost position from the central coordinate of the coverage hole among the multiple position coordinates and the central coordinate of the coverage hole as a radius of the coverage hole.

* * * * *